United States Patent [19]

Zibell

[11] 4,237,449

[45] Dec. 2, 1980

[54] SIGNALLING DEVICE FOR HARD OF HEARING PERSONS

[76] Inventor: J. Scott Zibell, 60 Brittany Ct., Charlotte, N.C. 28211

[21] Appl. No.: 916,420

[22] Filed: Jun. 16, 1978

[51] Int. Cl.[3] ........................ H04R 25/00; H04Q 9/00

[52] U.S. Cl. .................................... 340/407; 340/148; 179/107 FD

[58] Field of Search ............................... 340/407, 148; 179/107 FD

[56] References Cited

U.S. PATENT DOCUMENTS

| | | | |
|---|---|---|---|
| B 354,145 | 1/1975 | Nakamura | 179/107 FD |
| 3,536,861 | 10/1970 | Dunlavy | 179/107 S |
| 3,582,671 | 6/1971 | Ott | 340/148 |
| 3,786,628 | 1/1974 | Fossard | 340/407 |
| 3,798,600 | 3/1974 | Saikaishi | 340/148 |
| 3,818,149 | 6/1974 | Stearns | 179/107 FD |
| 3,989,904 | 11/1976 | Rohrer | 179/107 FD |
| 3,993,407 | 11/1976 | Moricca | 340/407 |
| 3,998,209 | 12/1976 | MacVaugh | 340/407 |
| 4,025,732 | 5/1977 | Traunmiller | 179/107 FD |
| 4,118,604 | 10/1978 | Yanick | 179/107 FD |

*Primary Examiner*—Harold I. Pitts

*Attorney, Agent, or Firm*—Jim Zegeer

[57] ABSTRACT

There is disclosed a signalling device for making hard of hearing persons aware of an impending happening in his or her proximity. The device comprises a sound transducer such as a microphone for converting sounds to electrical signals, an amplifier for amplifying the electrical signals and a selective filter connected to the amplifier for selecting amplified signals above a selected amplitude level and within a selected frequency range as may be produced by automobile horns, fire, police and emergency sirens, burglar and smoke alarms, door bells, barking dogs, and the like to produce a continuous, periodically pulsating control signal. These control signals are supplied to an indicator means such as a flashing light-emitting diode connected to a person's spectacles or a tactile alarm secured to the wrist of the person to provide a vibrating or pulsating signal to a sensitive area of the body such as the mastoid bone or the wrist or, alternatively, the device may be connected to a male-female electrical connector with a built-in electronic switch activated by the unit so that a lamp or light bulb plugged therein is turned on and off periodically to awaken the hard of hearing when a smoke alarm or whatever signal is detected.

10 Claims, 6 Drawing Figures

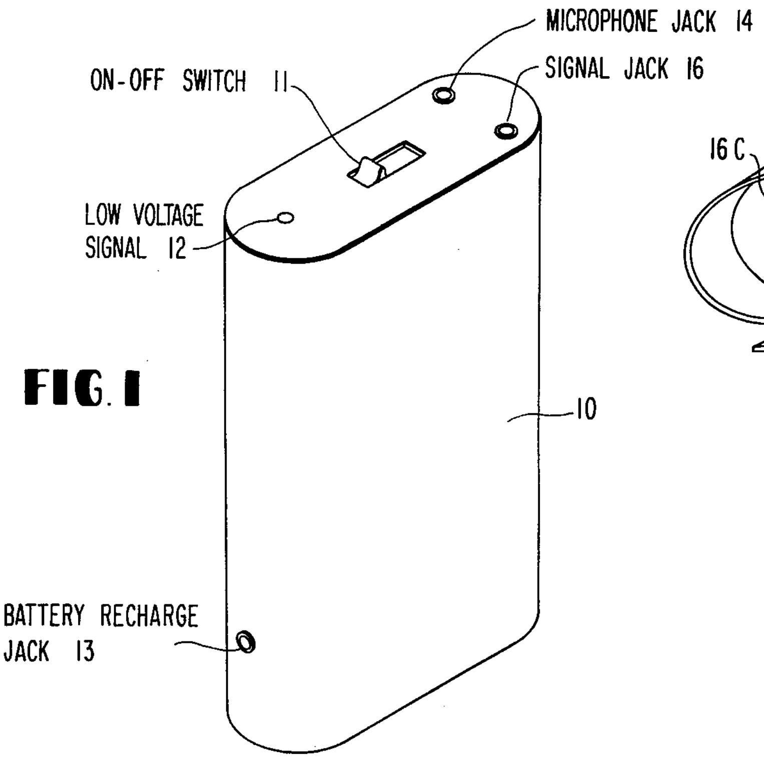
FIG. 1
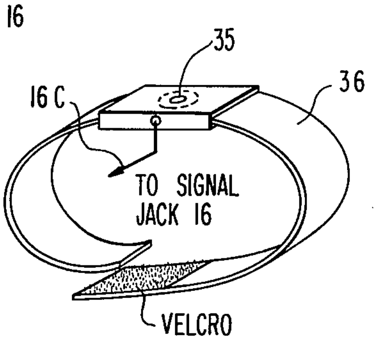
FIG. 4
FIG. 2
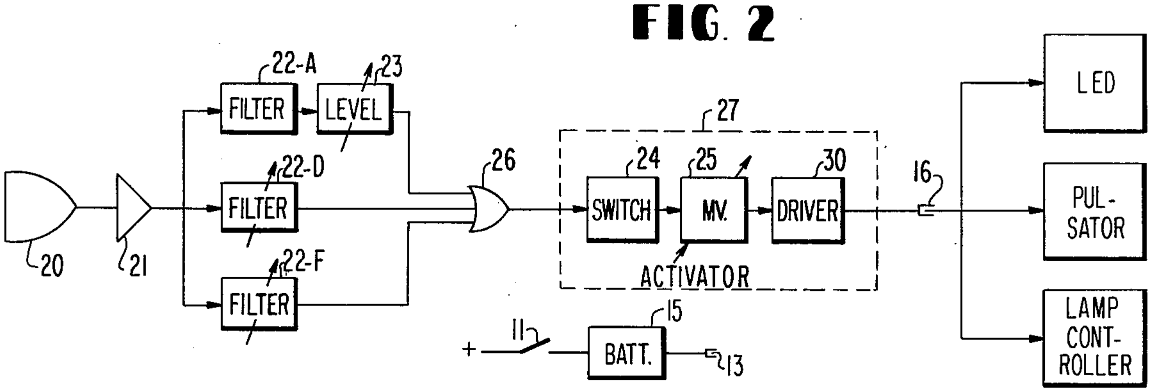
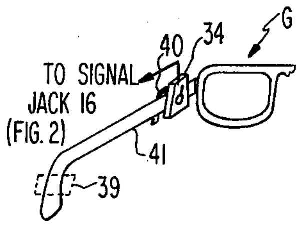
FIG. 3
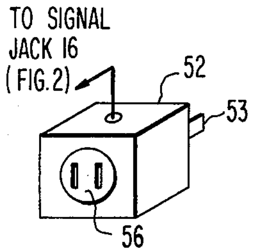
FIG. 3 A
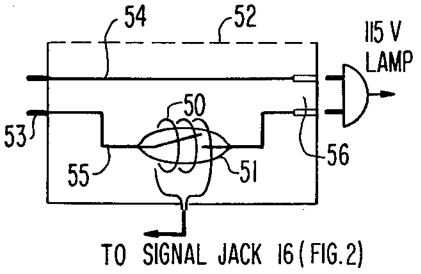
FIG. 3 B

SIGNALLING DEVICE FOR HARD OF HEARING PERSONS

BACKGROUND AND BRIEF DESCRIPTION OF THE INVENTION

There have been many instances where persons who are hard of hearing are startled or otherwise taken unawares of a possibly dangerous or hazardous impending happening in their proximity which, if an alarm be given to the hard of hearing, could prevent injury and/or other disastrous consequences. Very frequently, such happenings or events are preceded by a loud sound, such as an automobile horn, fire, police and emergency sirens, burglar alarms, smoke alarms, door bells, barking dogs. The object of the present invention is to provide a simplified low cost device which is adaptable to provide an early warning to persons hard of hearing and make them aware of impending, possibly disastrous happenings in their proximity. The device of the present invention comprises a battery powered unit capable of receiving signals of frequencies usually associated with such sounds which would be cause for alarm for the user. The signalling device alerts the user to the need to be aware of an impending happening in his proximity and it can be adapted for driving many kinds of signalling or inductor devices. In the first case, a small lamp or light-emitting diode can be attached to the spectacle frames or temple piece for the user who wears "glasses". A microphone or other sound transducer is used for detecting the sound made by the impending happening, to produce an electrical signal which is amplified, filtered and the signal then used to pulsatingly actuate a lamp such as a light-emitting diode or to activate a tactile signalling system such as a small vibrator worn on the ear adjacent the mastoid bone of the user or on his wrist. The same unit can also advantageously be used to act as a night alarm for sensing a smoke detector and/or burglar alarm and used to flash a table lamp, for example, on and off to arouse the sleeping hard of hearing person.

The above and other objects, advantages, and features of the invention will become more apparent when considered with the following specification and accompanying drawings wherein:

BRIEF DESCRIPTION OF THE DRAWINGS

FIG. 1 is an isometric illustration of the signally device for persons hard of hearing and incorporating the invention, FIG. 2 is a general schematic block diagram of an electrical circuit embodied in the invention, FIG. 3 is a diagrammatic illustration of a light emitting diode and a clip for attachment to the temple piece of spectacle or glass frames, FIG. 4 is a diagrammatic illustration of a wrist signalling system, and FIG. 5A and FIG. 5B are diagrammatic and schematic circuit illustrations of the night alarm system incorporated in the invention.

DETAILED DESCRIPTION

Referring now to the drawings, FIG. 1 shows a housing 10 containing the basic electrical components of the invention, and having an on/off switch 11 for connecting the electrical circuitry to a battery contained in the housing, a low battery voltage signalling lamp 12, which comes on to indicate to the user that the battery needs charging, a battery recharge jack 13 to which the unit is connected for recharging the internal batteries and, at the same time, driving this unit for the night time alarm, if desired, a microphone or transducer jack 14 for connecting a microphone or transducer input to the electrical circuit contained in the housing 10, and a signal output jack 16 for delivering an output signal from the driver circuitry to any one or more of a selected number of output units shown generally in FIGS. 3–5.

Referring now to FIG. 1, a microphone 20 which is preferably a wide band unidirectional microphone is provided for transducing sound waves to electrical signals and providing an output signal voltage to an amplifier 21. The output voltage from amplifier 21 may be applied to a plurality of filter elements 22-A, 22-D, 22-F, each of which can be tuned to select frequencies usually associated with sounds that can be a cause for alarm to the user, such as, for example, automobile horns (frequency range 500 to 8000 cycles per second), fire, police and emergency sirens (frequence range 500 to 4000 cycles per second), burglar and smoke alarms (frequency range 500 to 4000 cycles per second, door bells (frequency range 500 to 4000 cycles per second), and barking dogs (frequency rang 500 to 2000 cycles per second). Each of the filters 22 can, if desired, be selectively adjusted for selecting different frequencies that the user may wish to be particularly informed of in advance. In addition, the level or amplitude of the signal from the filter that the user of which is to be warned of or sensitized to can be selected by means of a level selector, thus, as shown in FIG. 2, the output of the filter 22-A is applied to level detector 23 which can be adjusted to select a certain level of loudness before a signal is transmitted to the user warning device.

Filters 22-D and 22-F are adjustable filters which may be adjusted to select any desired frequency range; there may be several more filters if desired, and each selected or tuned to a selected frequency. The output of the frequency sensitive or selective circuits 22 is applied via an OR gate 26 to drive activator circuit 27. Activator circuit 27 includes an electronic switch 24, and rate generator 25 such as a multivibrator which is activated on by electronic switch 24 (which may be a flip flop). The multivibrator output can be adjusted to adjust the frequency, and it is amplified by driver circuit 30 so that once a signal of the given amplitude and/or frequency is received from OR gate 26, activator circuit 27 will provide a continuous output signal to the signal jack 29. In this way, a single blowing of a horn, a single loud barking of an adjacent dog, or a single blowing of a siren or the like will activate the alarm to provide a series of continuous pulses, at the rate of the multivibrator, to drive the alarm device that the user may be using at that time. For example, if the warning or signalling device is a light-emitting diode, it will be plugged into the jack 16 by a cable 16C and the light-emitting diode will be pulses on and off at the rate set by the multivibrator. Of course, the multivibrator can easily be adjusted to provide any rate that is desired by the user. In like manner, the signal from the jack 29 can be used to drive the wrist unit shown in FIG. 4 which is simply a small vibrator coil 35 or a small microphone secured to the wrist of the user by Velcro straps 36 so as to warn the user through pressure on his or her wrist and/or mastoid (if the unit is secured adjacent the mastoid of the user as indicated by dotted tactile element 39 in FIG. 3). Alternatively, for night time alarm use, the night time alarm element shown in FIGS. 5A and 5B can be used.

Referring to FIG. 3, in this case, a small light such as a light-emitting diode 34 is attached by a spring clip 40 to the spectacle frames or temple piece 41 of the user who wears glasses G. When the unit is activated through a sound in the sensitivity range selected, the light-emitting diode 34 is caused to flash at the rate set by multivibrator 25. A small spring clip 40 is used to secure light-emitting diode 34 onto the temple piece 41 of the spectacle frames. The user's peripheral vision sees the light and he or she is thus alerted to an impending happening and its proximity. Alternatively, or in addition to the light-emitting diode, a vibrating or pulsing coil 39 is placed in contact with the sensitive area of the body, such as the mastoid bone, by securing same to the temple of the spectacle frame or by a wrist attachment such as shown in FIG. 4 to the wrist bone or the like. When the coil 39 of this unit is activated by the signal from the multivibrator 25, a pulsing sensation is registered at the contact area, thereby allerting the user to an impending happening in his proximity.

Finally, at night time, hard of hearing persons who cannot hear alarms such as burglar and/or smoke alarm systems, can use the present invention as a night alarm. In this case, the signal jack 16 has connected thereto a small coil 50 which is used to activate a magnetic reed switch 51 connected in one line of an alternating current circuit contained within the housing 52 (FIG. 5A). In this case, the alternating current circuit 52 has a male plug 53 formed in the rear surface thereof and a pair of wires 54, 55 leading to a female outlet 56. Reed switch 51 is connected in series in line 55 so that the pulsating signal from the multivibrator is used to supply a signal to coil 50 to thereby pulsate reed switch 51 and thereby pulsate the night lamp 60 that is positioned beside the table (not shown) of the user.

In the preferred embodiment, the housing 10 is removable for battery replacement and servicing and is self-contained and about the size of a king-sized pack of cigarettes. The unit is powered by a rechargeable battery 15 which is connected through the on/off switch 11 to the positive terminal to supply power to the circuit shown in FIG. 2. The recharger to which the plug in jack 13 is connected is not shown. The circuitry is carried on a printed circuit board and, if desired, the filters may be electronic filters and formed in printed circuit form. However, because of the size of the components needed for filtering some of the lower frequencies, the filters may be formed as discrete elements or in association with the integrated circuit elements constituted by the amplifier, level detector and multivibrators, as well as the OR gates and driving circuitry per se.

The unit is placed in the user's shirt or jacket pocket, or may even be attached to his clothing. The microphone 20 is attached to the wearer's outer garment for maximum sensitivity. The signalling device, in the case of a flashing lamp, is the subminiature light-emitting diode (LED) clipped to the temple piece of the frame of the wearer's glasses and the connecting wire is placed unobtrusively behind the temple piece, behind the ear and down the neck to the unit jack 16. When, as described above, the signalling device is used to sensitize the wristbone, a tactile activator can be used and contained in a wrist strap which would be secured around the wearer's wrist as shown in FIG. 4, the connecting wire (not shown) going up the arm to the signal jack 16. In the night alarm use described herein, it is plugged into the signal jack in lieu of the light-emitting diode and/or wrist unit and operates as described earlier to provide a repeating on/off or flashing sequence of light which would arouse the sleeping person. This could be operating while the battery unit is being charged. The drain on the battery while in the "on" condition is considerably less than the rate of charging. Consequently, by morning the battery would be sufficiently charged to provide proper service during the following day.

While I have shown, described and illustrated preferred embodiments of the invention, it will be appreciated that other adaptations, modifications and departures can be made without departing from the spirit and scope of the invention as defined in the appended claims.

What is claimed is:

1. A signalling device for making a hard of hearing person aware of an impending happening in his proximity which is foretold by a distinguishable sound, comprising in combination:

a sound transducer for converting said distinguishable sound made in advance of the impending happening and associated therewith to an electrical signal, means for receiving and amplifying the electrical signal from said sound transducer, selective filter means connected to said means for receiving and amplifying for selecting amplified signals above a selected amplitude and within a selected frequency range, and an indicator means connected to said selective filter means for providing a non-aural stimulus to said hard of hearing person.

2. The invention defined in claim 1 wherein said indicator pulsator means is a lamp, and means driven by said selected amplified signals for providing a continuous sequence of pulsating signals to drive said lamp in flashing fashion.

3. The invention defined in claim 2 wherein said lamp is an alternating current incandescent lamp, and means connecting said lamp to an alternating current outlet, and pulsatable switch means in said circuit connected to receive said pulsating signals from said pulsator means and thereby flash said incandescent lamp on and off.

4. The invention defined in claim 1 wherein said indicator means is a tactile signalling device adapted to sensitize a sensitive area on the body of the user.

5. The invention defined in claim 4 wherein said sensitized area of the body is the wristbone of the user and including means for securing said unit to the wrist of the user.

6. The invention defined in claim 1 wherein said indicator unit is a tactile device, and means for adhering said tactile device to the spectacles of the user so as to contact the mastoid bone of the user and sensitize same upon the occurrence of an impending event in the proximity of the user.

7. A signalling device for a hard of hearing person comprising a sound transducer for converting all sounds in the area of said hard of hearing person, including sounds of impending happenings of which said hard of hearing person desires to be warned, to electrical signals and amplifying same, a plurality of selective filter means, each selecting an amplified signal within a selected frequency range selected from the group comprising automobile horns, fire, police and emergency sirens, burglar and smoke alarms, door bells, and barking dogs, and means responsive to an output signal from any of said plurality of selective filters for providing a non-aural stimulus to said hard of hearing.

8. The invention defined in claim 7 wherein each of the outputs of each of said selective filter means is supplied to an OR gate, and the output signal of said OR gate is supplied to said means responsive to an output signal from any of said plurality of selective filters.

9. The invention defined in claim 7 wherein said means responsive includes an activator circuit, common to all said selective filter means, and non-aural stimulus means driven by said activator circuit for providing said non-aural stimulus.

10. The invention defined in claim 9 wherein said activator circuit terminates in an electrical connector jack, and said non-aural stimulus means includes an input connector terminal adapted to mate with said electrical connector jack and supply a driving signal to said non-aural stimulus means.

* * * * *